Feb. 25, 1964　　W. R. UTTAL ETAL　　3,121,960
EDUCATIONAL DEVICE

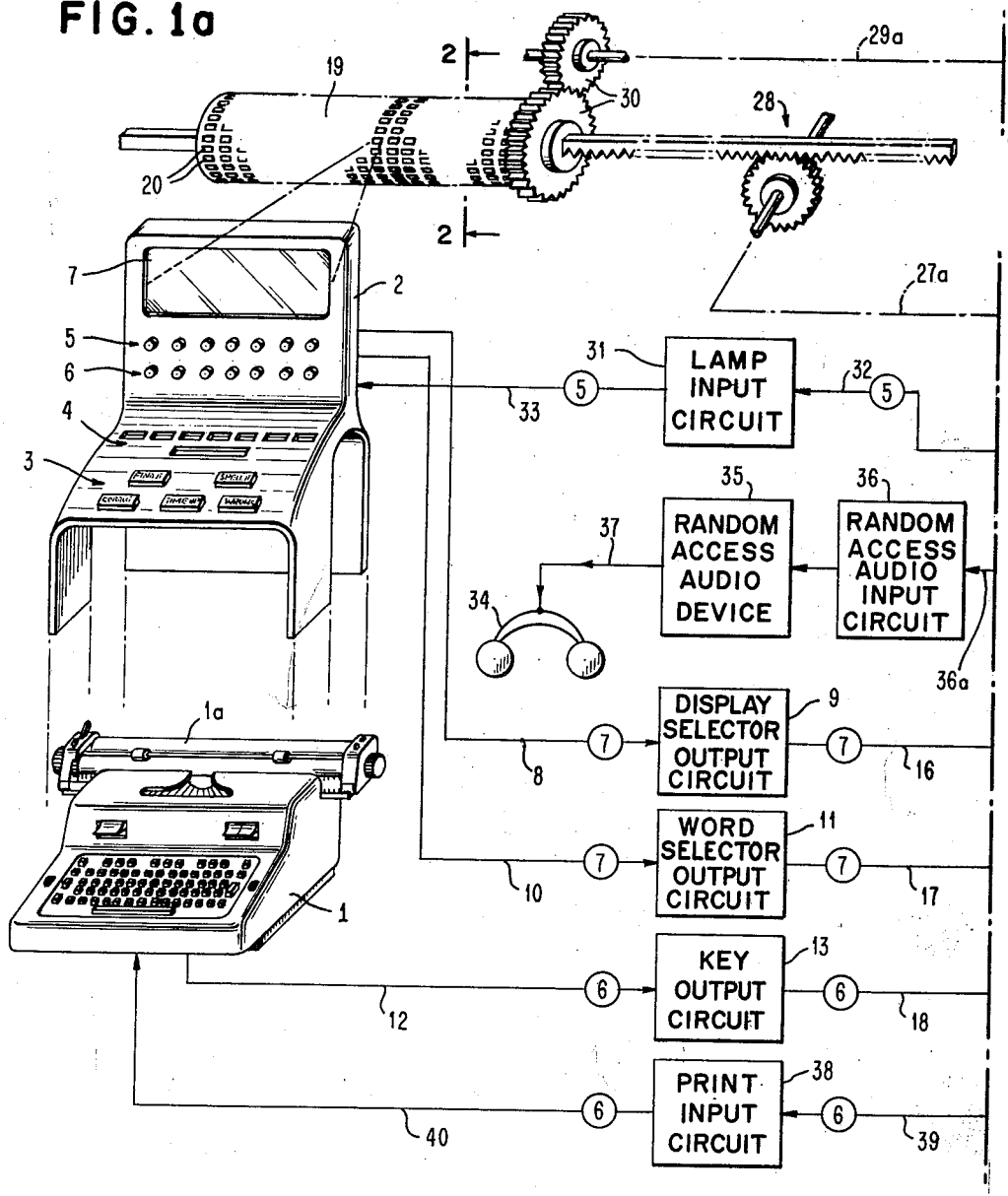

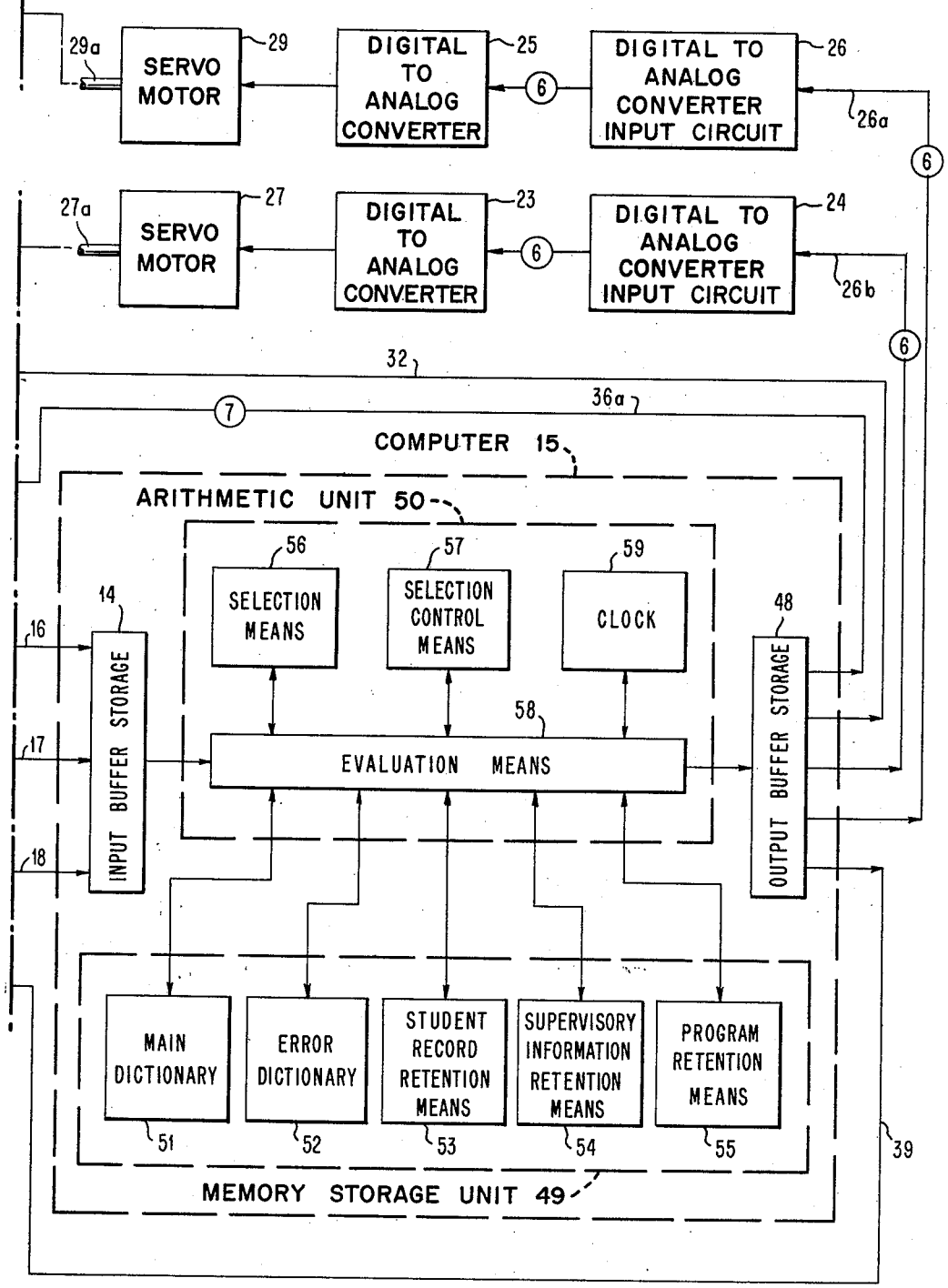

Filed May 8, 1962　　　　　　　　　　　　　　　6 Sheets-Sheet 3

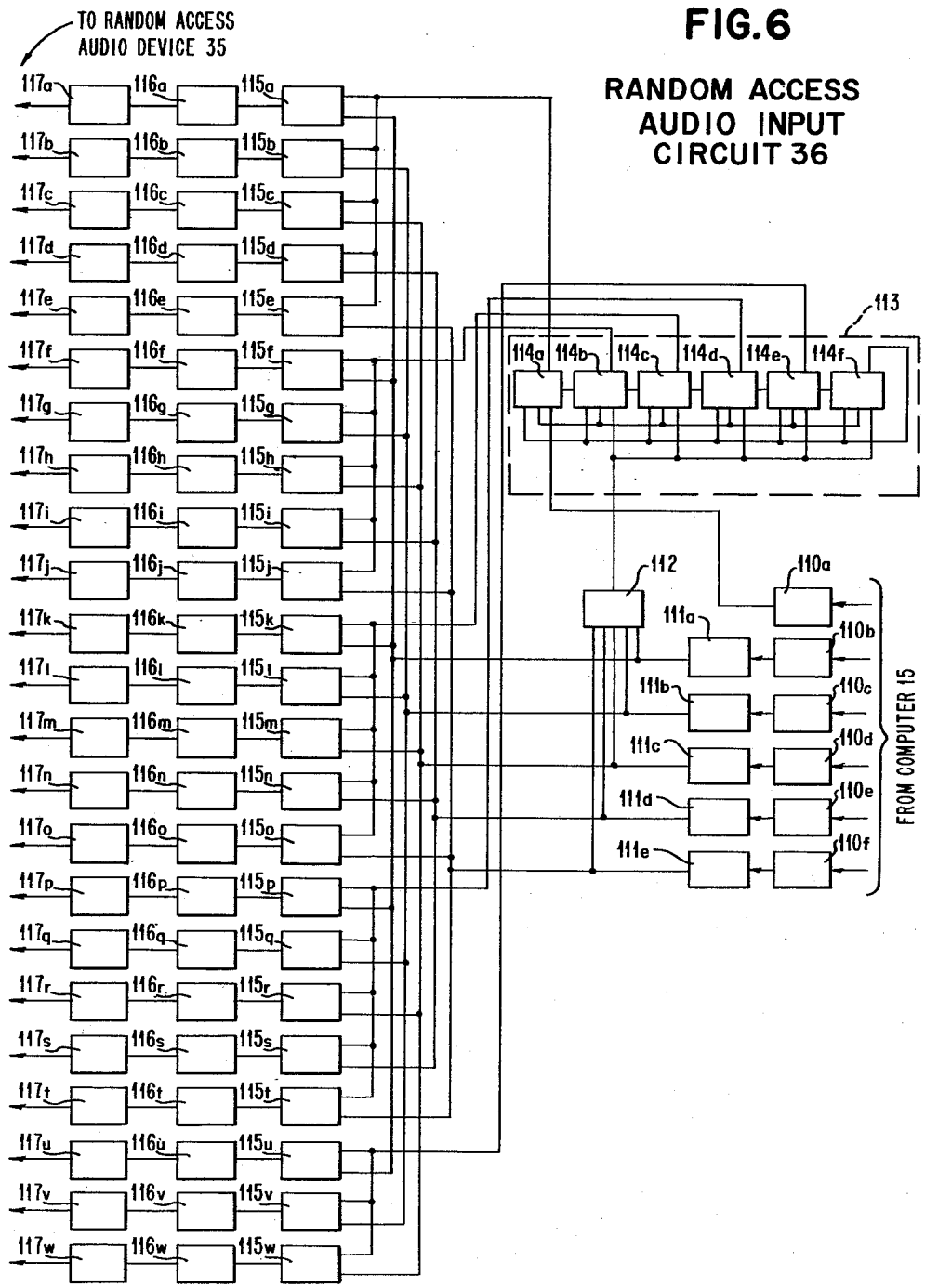

United States Patent Office 3,121,960
Patented Feb. 25, 1964

3,121,960
EDUCATIONAL DEVICE
William R. Uttal, Yorktown Heights, and Louella Cook, Thornwood, N.Y., assignors to International Business Machines Corporation, New York, N.Y., a corporation of New York
Filed May 8, 1962, Ser. No. 193,087
3 Claims. (Cl. 35—9)

The present invention relates to an educational device for the teaching of mental concepts such as reading, vocabulary, pronunciation, and spelling, and more particularly to a multiple channel educational device for teaching mental concepts.

It is currently recognized that devices employed for educational purposes, popularly referred to as "teaching machines," are very useful as aids to teachers and tutors. These devices can automatically present curriculum material, receive student responses and evaluate the students results and progress. When properly designed and utilized, teaching machines can undertake much of the tedious and routine class room tasks and thus permit the teacher more time for tutorial duties.

Teaching machines generally include three basic components: a means for presenting information to the student; a means for receiving student response; and a means for processing and evaluating the student response. Within this basic framework the various teaching machines differ as to individual design, complexity, and effectiveness depending, among other factors, on the subject matter to be taught. Thus, a machine for teaching a mental concept such as history might require a group of push buttons or switches as the student's response means whereas a machine for teaching a manual skill such as typewriting would require a typewriter keyboard for the student to manipulate. It is of primary importance, therefore, that prior to designing a teaching machine the subject matter that is to be taught should be carefully considered and analyzed so that the resulting physical design and modes of operation of the machine are compatible with the particular subject matter being taught and that the student's response means be psychologically advantageous.

The above remarks may be illustrated by referring to a specific example such as the teaching of spelling. One approach to the design of such a machine would be a presentation wherein a number of printed words are presented along with a picture of one item. The student is then required to select the correct word via multiple choice selection switches. A more powerful teaching approach, particularly for the advanced student, would be to have the student spell the word by himself (via a typewriter response means) thereby eliminating guess work.

It is the intention of the present invention to provide an automated educational device for teaching mental concepts, for example, reading, vocabulary, pronunciation, and spelling, wherein the presentation, processing, and student response portions are selected such that they are efficiently compatible with the learning process. Secondly, multiple channels for presentation and response are provided and are operated in combinations to reinforce the learning process and to permit operation modes which are more powerful than single channel modes. The embodiment of the present invention to be described includes audio, pictorial, and print presentations and allows the student to respond by multiple choice and constructed response. By employing combinations of the presentation and response modes, many operational modes are possible and the most appropriate ones of these may be selected for particular teaching situations.

In view of the versatility of the present invention, it may be employed to teach more than one specific concept. In the present embodiment the general subject matter is "words" and the system may be utilized to teach reading, vocabulary, pronunciation, and spelling, in the English language or a foreign language, to inexperienced or advanced students of all age groups. In addition to versatility, the multiple channel presentation and response modes provide for more effective learning.

The theory that redundant information presented via multiple channels is more effective in producing learning than presentation in a single channel has been investigated and verified by educators and psychologists. The article "Recognition Learning Under Multiple Channel Presentation and Testing Conditions," by Frank R. Hartman, in Audio-Visual Communications Review, vol. 9, No. 1, January-February, 1961, discusses the results obtained with information presentations in the audio, print, and pictorial modes, taken singularly, in various combinations, and all together. The conclusions drawn from these results indicate that multiple channel simultaneous presentations are superior to the single channel. Likewise, Harold E. Nelson in the article, "Pictorial and Verbal Elements of Educational Films," Journal of Communication, vol. 3, pages 43–47, 1953, states "the use of both visual and auditory presentation in combination has usually been better than the poorer of the two used separately, and in some cases, superior to either one used alone." Thus, there are advantages in multiple channel presentations in the learning process. In accordance with this fact, the present invention has been developed to provide an automated educational device having principles of operation which provide a more powerful and efficient teaching aid.

An object of the present invention is to provide a versatile educational device having multiple information presentation channels.

Another object of the present invention is to provide an educational device having multiple student response channels.

Another object of the present invention is to provide an educational device wherein the presentation channels and response channels may be utilized in various combinations to effect a plurality of operational modes.

A further object of the present invention is to provide an educational device for teaching the related mental concepts of reading, vocabulary, pronunciation, and spelling.

Another object of the present invention is to provide an educational device which may be utilized by students within a wide range of experience and ability.

A still further object of the present invention is to provide an educational device having presentation and response means operable in combination with a standard electronic digital computer and a standard electric typewriter.

A feature of the present invention is the provision of an educational device for teaching mental concepts comprising an information presentation means including audio, pictorial, and print channels, a response means including multiple choice and constructed response channels, and means coupled to the presentation and response means including means for receiving information from the response channels, means for evaluating the responses from the response chnanels, and means for transmitting information to the presentation means via the audio, pictorial, and print channels.

The foregoing and other objects, features and advantages of the invention will be apparent from the following more particular description of a preferred embodiment of the invention, as illustrated in the accompanying drawings.

In the drawings:

FIG. 1 represents the manner in which FIG. 1a and FIG. 1b are combined to form a composite block diagram and schematic drawing of an educational apparatus following the principles of the present invention;

FIG. 2 is a side elevation view of the pictorial projection device employed in the apparatus of FIG. 1a;

FIG. 3 is a front elevation view of the information presentation and response devices employed in the apparatus of FIG. 1a;

FIG. 4 is a schematic drawing of the computer input circuitry employed in the apparatus of FIG. 1a;

FIG. 6 is a block diagram of a portion of the audio circuit employed in the apparatus of FIG. 1a.

Figure 2:
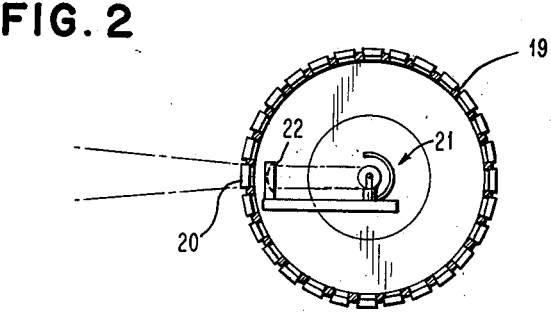

Referring to the composite of FIGS. 1a and 1b, an educational apparatus is shown including an input-output electrical typewriter 1, for example the "IBM" Model 731 input-output typewriter. A cover panel 2 is designed to fit over typewriter 1. Cover panel 2 includes a plurality of lamps 3 having supervisory information printed thereon, a plurality of slot openings 4 through which the student can view the typewriter platen 1a when the cover panel is in place, a first and second plurality of multiple choice buttons 5 and 6 for the student response, and a vision screen 7 upon which information may be optically back-projected. The push buttons 5 are each electrically connected, via cable 8, to a display selector output circuit 9. Push buttons 6 are each electrically connected, via cable 10, to a word selector output circuit 11. The forty-four keys of typewriter 1 are internally coupled to six contacts which are provided as standard equipment with the typewriter. Distinct combinations of the contacts are actuated in response to each of the keys being struck. The six contacts are each electrically connected, via cable 12, to a key output circuit 13. The outputs of display selector output circuit 9, word selector output circuit 11, and key output circuit 13 are coupled to the input buffer storage 14 of an electronic computer 15 via cables 16, 17, and 18, respectively.

An image projector 19 is physically located behind cover panel 2 and consists of an opaque, hollow cylinder having a plurality of slots on the surface thereof arranged in rows and columns. Each slot has a transparent slide inserted therein. Each transparent slide 20 has one or more images disposed thereon either by photographic or graphic methods. Referring now to FIG. 2, a side elevation section view of projector 19 is shown, with a fixed light source 21 located in the center of the cylinder. A fixed optical lens 22 directs the light from source 21 through a single transparent slide 20. The particular slide 20 through which the light will be directed depends on the position of the cylinder with respect to the fixed light source and lens. The position of the cylinder with respect to the fixed light source and lens is varied by means of servo motors and suitable gearing.

Referring again to FIGS. 1a and 1b, the servo motors 27 and 29 and gearing 28 and 30 are schematically shown. A digital signal having a value related to lateral linear movement is obtained from computer 15 and transmitted to a digital-to-analog converter 23 via a suitable input circuit 24. Likewise, a digital signal related to rotational movement is transmitted to digital-to-analog converter 25 via input circuit 26. An analog signal proportional to the desired lateral cylinder movement is transmitted to servo motor 27 which in turn drives the cylinder in a lateral direction by means of suitable gearing 28, shown for example as a rack and pinion arrangement. An analog signal proportional to the desired rotational movement is transmitted from converter 25 to servo motor 29, which in turn rotates the cylinder by means of suitable gearing 30, shown for example as spur gears. Thus, by appropriate signals from computer 15, the various transparent slides 20 may be selectively positioned in front of the light source 21 and lens 22 thereby projecting desired images on screen 7.

A lamp input circuit 31 is provided to receive signals from computer 15 transmitted on cable 32 and to illuminate selected lamps 3 via signals transmitted on cable 33.

An audio channel is provided including a pair of earphones 34 which are worn by the student and a random access audio circuit 35 with a suitable input circuit 36. An address signal from computer 15 is transmitted to random access audio circuit 35 via input circuit 36 where a plurality of messages are stored on a recording medium, for example, magnetic discs. In accordance with the address signal from the computer a read-out head selects a given message, which is then transmitted as an audio signal to the earphones 34 via cable 37.

A print input circuit 38 is provided to accept signals from computer 15 on cable 39 and to modify these signals into a form such that they will actuate the print solenoids which are included as standard equipment in typewriter 1. When transmitted via cable 40, the printing solenoids in typewriter 1 are actuated in various combinations to determine the selection of given ones of the forty-four typewriter keys so that a message can be typed out.

Figure 3:
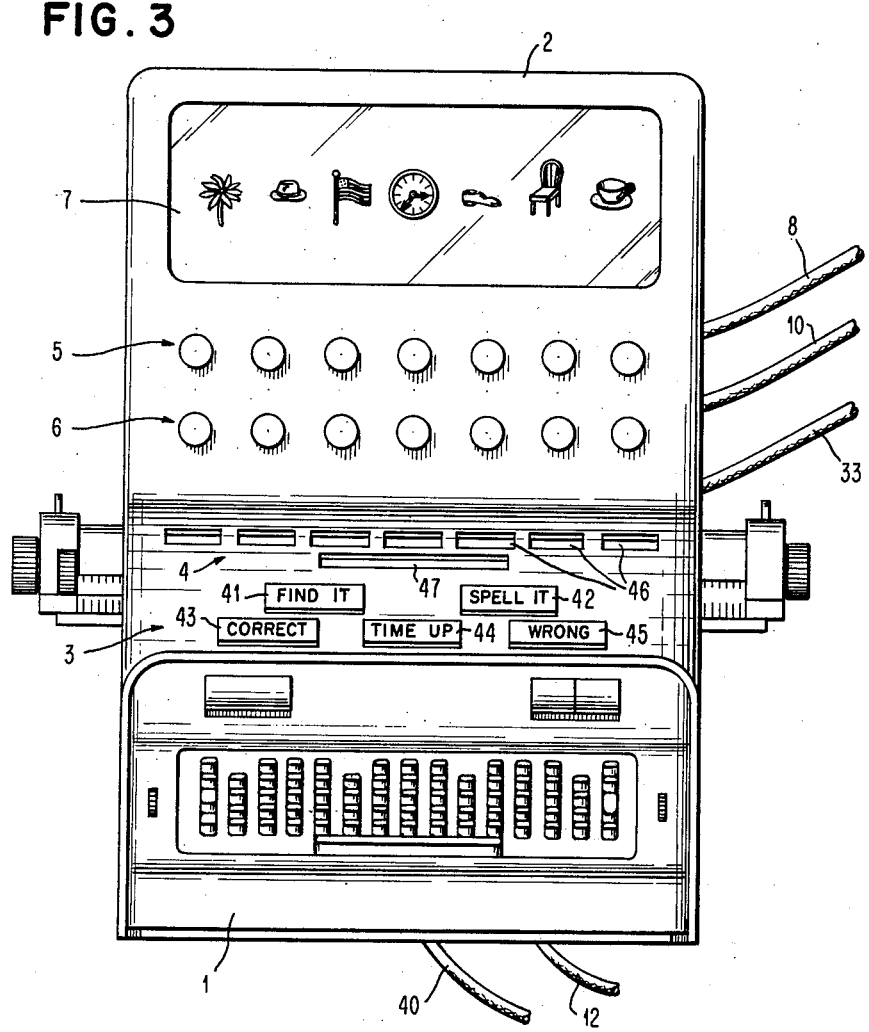

Referring to FIG. 3, a front elevation view of typewriter 1 is shown with cover panel 2 positioned in place. Each one of the five lamp panels 3 are assigned a different supervisory message. Thus, lamp 41 has "FIND IT" inscribed thereon, lamp 42 contains "SPELL IT," lamp 43 contains "CORRECT," lamp 44 contains "TIME UP," and lamp 45 contains "WRONG." The signals from lamp circuit 31 (FIG. 1a) are transmitted through cable 33 to the appropriate lamp to present the desired message.

The slots 4 in the cover panel include a plurality of slots 46, shown, for example, as seven slots, each being wide enough to display a ten character word when automatically typed on the platen 1a by print information signals from computer 15. A single slot 47 is located on the line below slots 46. Slot 47 permits the student to see the word which he types as a constructed response to a question. Multiple choice selection buttons 6 include a separate button associated with each of the slots 4. In one particular mode of operation of the invention, to be more fully described, the student is required to select one of the words appearing in slots 4, which he accomplishes by pressing one of the buttons 6. The signal from the selected button is then transmitted to word selector output circuit 11 (FIG. 1a) via cable 10.

Display screen 7 is arranged to display the projections originating from image projector 19 (FIG. 1a). As previously described, each slide on projector 19 can be selectively displayed on screen 7. Each slide contains a plurality of recognizable images (shown, for example, as seven) which form part of the pictorial information channel. In another particular mode of operation of the invention, the student is required to select one of the displayed images. A separate one of multiple choice buttons 5 is associated with each of the displayed images and the student makes his selection by pressing one of these buttons. The signal from the selected button is then transmitted to display selector output circuit 9 (FIG. 1a) via cable 8.

Push buttons 5 and 6 are connected to relays (not shown) within cover panel 2 such that as each button is pushed the associated relay is closed, placing a +48 volt signal on the push-button output line.

The display selector output circuit 9, the word selector output circuit 11, and key output circuit 13 shown in FIG. 1a are provided to accept the +48 signals from the relays associated with the multiple choice buttons 5 and 6 and from the output contacts from typewriter 1 and transmit the information therein in a form suitable for utilization by computer 15 shown in FIG. 1b. Computer 15 may, for the purpose of the present invention, be selected from a class of presently available general purpose electronic computers. In the preferred embodiment shown in FIG. 1b the computer may be the "IBM" 650 Magnetic Drum Computer. The computer includes an input buffer storage unit 14, an output buffer storage unit 48, a modifiable general memory storage unit 49 and an arithmetic unit 50. The memory storage unit 49 consists of a magnetic drum having information stored thereon. The various classes of information stored in memory storage unit 49 may be functionally shown as a main dictionary means 51 for retaining the information which will be presented to the student in the audio, visual and print channels, an error dictionary means 52 for storing the particular information of means 51 that the student has incorrectly responded to, a student record retention means 53 for storing information related to the student's performance (these may include how many errors he makes, how many occasions he has not responded with the alotted time), a supervisory information retention means 54 for storing the information used to illuminate lamps 3, and a program retention means 55 for retaining the decision rules which determine the order and mode of information presentation. The arithmetic unit 50 includes the circuitry for selecting the information from the storage unit 49 and for processing this information in accordance with the stored program and the student's responses. Arithmetic unit 50 can be functionally shown as including a selection means 56 for selecting information from the various retention means in a predetermined sequence, a selection control means 57 for varying the predetermined sequence of selection means 56, and an evaluation means 58 for performing the logical processing of the stored and received information and a real time clock 59 for providing a specific time for a student response. As was stated hereinabove, computer 15 represents a device which is presently available in the art, and the showing herein of further structural details are not considered necessary. Further, details of the I.B.M. computer employed as computer 15 in the preferred embodiment are shown in U.S. Patent 2,959,351, to F. E. Hamilton et al., issued November 8, 1960, and assigned to the International Business Machines Corporation.

Prior to discussing the operation of the present invention an explanation of the circuitry associated with the various elements of the system of FIGS. 1a and 1b will be given. Examples of available equipment which may be employed for typewriter 1 and computer 15 having been given, the following discussion will relate to the display selector output circuit 9, word selector output circuit 11, key output circuit 13, digital-to-analog converters 23 and 25, digital-to-analog converter input circuits 24 and 26, random access audio device 35, random access audio input circuit 36 and print input circuit 38.

Figure 4:
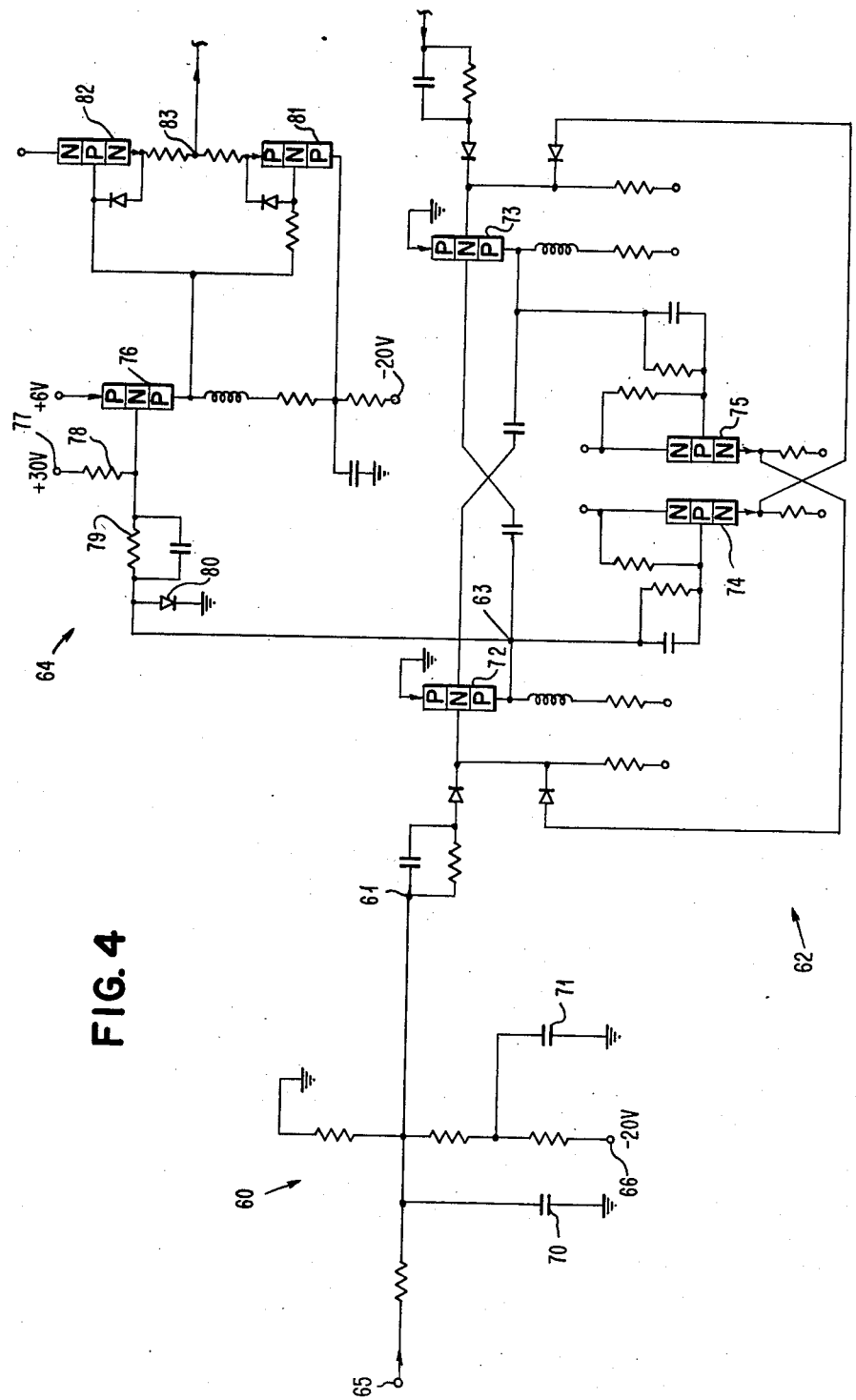

The display selector output circuit 9, word selector output circuit 11 and key output circuit 13 contain the same circuitry. Referring to FIG. 4 this circuitry is shown including an integrator circuit 60 which converts the closed (+48 volt) signals and the open (zero volt) signals of the relays associated with push buttons 5 and 6 and the solenoids of typewriter 1 into −2 volts and −10 volts, respectively, at point 61. A trigger circuit 62 including two PNP transistors and two NPN transistors switches in response to the signal change at point 61 to provide either a zero or −12 volt signal at point 63. The zero or −12 volt signal at point 63 is applied to a converter circuit 64 which converts the zero or −12 volt signal to a +10 volt or −30 signal which is required to drive the vacuum tube circuits contained in the input of computer 15.

More particularly, a separate one of the circuits shown in FIG. 4 is associated with each of the multiple choice push buttons 5 and 6 and with each of the six contacts in typewriter 1. Thus display selector output circuit 9 includes seven of such circuits each connected to a separate one of the relays associated with buttons 5 by a separate lead contained within cable 8. Likewise word selector output circuit 11 contains seven such circuits, each connected to a separate one of the relays associated with buttons 6 via a separate lead in cable 10, and key output circuit 13 contains six such circuits each connected to a separate one of the typewriter contacts via a separate lead in cable 12.

Each of the relays associated with push buttons 5 and 6 and the typewriter contacts provide an open circuit condition normally, but when the buttons are pushed a source of +48 volts supply (associated with the push-button relays but also not shown) is connected to the input 65 in the circuit of FIG. 4. Typewriter 1 ("IBM" Model 731) also provides a +48 volt signal on the output side of the contacts. When there is no +48 volt input signal present at input 65 the current flow from the −20 volt supply 66 provides approximately a −10 volt signal at point 61. When a +48 volt signal is present at point 65 (from a push-button relay or typewriter contact as the case may be), the current through the integrator 60 increases and the voltage at point 61 raises to approximately −2 volts. The voltage change at point 61 is applied to the input of trigger circuit 62. Capacitors 70 and 71 aid in eliminating transient and noise effects.

The −10 volt to −2 volt excursion at point 61 causes trigger circuit 62 to switch, providing a signal at point 63 that changes from −12 volts to zero volts. Trigger circuit 62 is a conventional transistor flip-flop having two PNP inverters 72 and 73 and two NPN emitter followers 74 and 75.

The −12 volt or zero volt output signal at point 63 is applied to converter circuit 64. When point 63 is at zero volts the base level of PNP transistor 76 is set at approximately +7.5 volts by the +30 volt source 77 and the divider network 78, 79, and 80. Transistor 76 is reversed biased and off. The collector of transistor 76 is near −20 volts and forward biases transistor 81 on and reverse biases transistor 82 off. The potential at point 83 is approximately −19.7 volts. When point 63 switches to −12 volts, transistor 76 becomes forward biased and conducts. The collector of transistor goes to +6 volts and causes transistor 82 to be forward biased and transistor 81 to become reversed biased. Conduction through transistor 82 raises the potential at point 83 to +5.7 volts. The −19.7 volt and +5.7 volt levels at point 83 may be directly applied to the tube circuits at the input of computer 15. The circuits shown in FIG. 4 are specifically designed to receive +48 volt signals produced by the "IBM" Model 731 typewriter and the push buttons and adjust these signals so they may be applied to the "IBM" 650 Computer. It is understood that if another model typewriter or general purpose computer were employed in this invention, the specific circuitry in FIG. 4 would have to be modified to account for different operational conditions.

At the output side of the computer 15 there are the digital-to-analog converters 23 and 25 with their input circuits 24 and 26, random access audio device 35 with input circuit 36, lamp input circuit 31, and print input circuit 38.

Digital-to-analog converters 23 and 25 are devices of standard design. They accept a digital signal and produce the analog equivalent of this signal. The analog equivalent signal is then employed to rotate a shaft (27a and 29a) a proportional analog amount through means of a servo motor (27 and 29) also of conventional design.

Converter 25, motor 29, shaft 29a, and gearing 30 are employed to rotate projection means 19 a predetermined amount up to one full revolution. Converter 23, motor 27, shaft 27a, and gearing 28 are employed to move projection means 19 in a lateral direction up to its entire length. Thus, any point on the surface of cylinder 19 can be positioned in front of projection lamp 21 and lens 22 in accordance with the proper digital signals from computer 15. Computer 15 provides a six information bit digital signal, to both input circuits 26 and 24 which then apply the signals to the rotational converter 25 and the lateral converter 23 respectively. Thus cylinder 19 may occupy any one of sixty-four lateral positions simultaneously with any one of sixty-four angular positions, providing the possibility of over four thousand positions for slide transparencies 20.

The random access audio circuit 35 is an addressable audio storage device, and may be a modified "IBM" 355 "RAMAC" Random Access Storage. The "RAMAC" includes a plurality of magnetic storage discs with readout heads and is shown in U.S. Patent 2,994,856 to W. E. Diskinson, issued August 1, 1961 and assigned to the International Business Machines Corporation. Upon the reception of a digital address signal, selected information from given portions of the discs are read out through output amplifiers as digital information. For purposes of this invention the "RAMAC" is modified such that the rotational speed of the discs is decreased and audio information is magnetically stored instead of digital information. The amplifiers are replaced by audio amplifiers suitable for providing an audio signal to earphones 34. Thus, upon the occurrence of digital address signals from computer 15, an audible command or presentation may be directed to the student via earphones 34.

Figure 5:
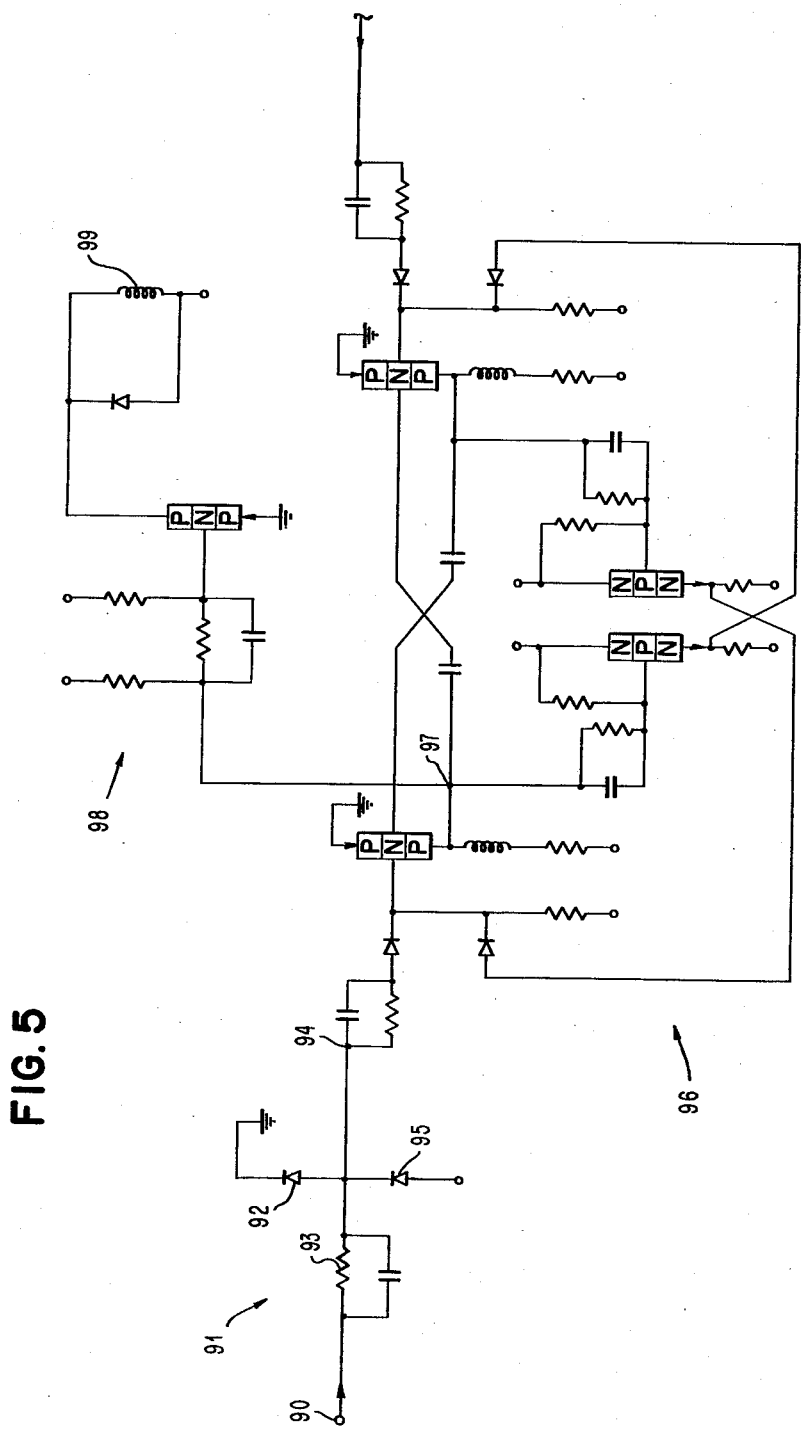
FIG. 5 is a schematic drawing of the computer output circuitry employed in the apparatus of FIGS. 1a and 1b.

Lamp input circuit 31 and print input circuit 38 contain the same circuitry, which is shown in detail in FIG. 5. There is one such circuit associated with each of lamps 3 and with each of the print solenoids in typewriter 1. Thus, lamp circuit 31 contains five circuits identical to that shown in FIG. 5, each connected to a separate one of lamps 3 via a separate lead in cable 33, and print circuit 38 contains six such circuits, each connected to a separate print solenoid in typewriter 1 via a separate lead in cable 40.

Referring to FIG. 5, input point 90 is connected to the output of computer 15 in lamp circuit 31 by a lead in cable 32 and in print circuit 38 by a lead in cable 39. A converter circuit 91 is provided to convert from the computer tube voltage levels to transistor levels. The tube voltage level (from the "IBM" 650) at point 90 is either −35 volts or +10 volts. When the +10 volt signal is present, conduction through diode 92 and resistor 93 clamps point 94 at zero volts. When the signal at point 90 drops to −35 volts, diode 95 becomes forward biased and limits the voltage at point 94 to approximately −12 volts.

The voltage change at point 94 causes trigger circuit 96 to switch. Trigger circuit 96 is a conventional transistor flip-flop, and is identical to trigger circuit 62 in FIG. 4. Point 97 of trigger 96 varies between −12 volts and zero volts in response to the voltage variation at point 94. The voltage change at point 97 is applied to a relay driver circuit 98 which in turn drives a relay 99 associated with each of the lamps 3, thereby illuminating the lamp.

The digital-to-analog converter input circuits 24 and 26 each accept a six information bit signal from computer 15 and modify the signal so it may be applied to digital-to-analog converters 23 and 25. Digital-to-analog converters 23 and 25 are conventional devices, the type employed in the present embodiment having six input relays (one for each bit position) so that input circuits 24 and 26 are required to accept the computer output signal and modify it for a relay input. Thus, input circuits 24 and 26 contain circuits identical to the circuit shown in FIG. 5. There are six leads in each of cables 26a and 26b, each containing an information bit (+10 volt and −35 volt signals) which are converted by six circuits (as shown in FIG. 5) in each of input circuits 24 and 26 into a form suitable to drive the relays in digital-to-analog converters 23 and 25. The operation of the six circuits in each of input circuits 24 and 26 is identical in relation to lamp input circuit 31 (FIG. 5).

The random access audio input circuit 36 which precedes the random access audio device 35 is basically a serial to parallel converter and is shown in more detail in FIG. 6. The input side of the random access audio device 35 (modified "RAMAC") includes twenty-three relays, twenty of which are for selecting tracks on the memory discs and the remaining three relays select the readout arms. The audio information signals from computer 15 are in the form of serial bits on five of the six separate lines within cable 36a. Referring to FIG. 6 the random access audio input circuit includes six line converters 110a to 110f coupled to each of the leads from computer 15. Converters 110a to 110f convert the +10 volt and −35 volt potentials from computer 15 to zero volts and −12 volts and are identical to converter 91 in FIG. 5. The output of the five converters 110b to 110f are coupled to the emitter followers 111a to 111e. The emitter followers are coupled through a five-way AND circuit 112 to a shift register 113. Shift register 113 includes six trigger circuits 114a ot 114f similar to trigger circuit 62 in FIG. 4. The trigger circuits are coupled to AND circuits 115a to 115w in such manner that trigger 114a is coupled to AND gates 115a to 115e, trigger 114b is coupled to AND gates 115f to 115j, trigger 114c is coupled to AND gates 115k to 115o, trigger 114d, is coupled to AND gates 115p to 115t, and trigger 114e is coupled to AND gates 115u to 115w. The output of trigger 114f is coupled back to the other triggers as a reset pulse.

The output of emitter follower 111a is coupled to AND gates 115a, 115f, 115k, 115p, and 115u. Emitter follower 111b is coupled to AND gates 115b, 115g, 115l, 115q, and 115v. Emitter follower 111c is coupled to AND gates 115c, 115h, 115m, 115r, and 115w. Emitter follower 111d, is coupled to AND gates 115d, 115i, 115n, and 115s and emitter follower 111e is coupled to AND gates 115e, 115j, 115o, and 115t. The outputs of AND gates 115a to 115w are respectively coupled to trigger circuits 116a to 116w (also similar to trigger 62 of FIG. 4) which are in turn respectively coupled to relay drivers 117a to 117w (similar to relay driver 98 of FIG. 5). Relay drivers 117a to 117w are coupled to the relays in the random access audio device 35.

The input signal to the circuit of FIG. 6 is initially a start pulse to converter 110a and a two-out-of-five decimal digit code signal to converters 110b to 110f. The two-out-of-five code is a well known self-checking code wherein each digit is five bits in length and has two and only two "one" bits. The start pulse from converter 110a switches trigger 114a which transmits a gating signal to AND gates 115a through 115e and also sets trigger 114b. The signals from converters 110b to 110f are also transmitted to AND gates 115a through 115e and are, therefore, gated through to triggers 116a through 116e and relay drivers 117a through 117e.

The next two-out-of-five code pulses are applied to converters 110b through 110f and will switch trigger 114b via gate 112. The signal from trigger 114b gates these input signals through gates 115f through 115j and sets trigger 114c. In like manner the succeeding input signals switch triggers 114c, 114d, and 114e and are gated through gates 115k to 115o, 115p to 115t, and 115u to 115w. The sixth group of input signals is a dummy signal which switches triggers 114f, thereby resetting triggers 114a to 114e, but is not gated through to the output. Thus the signals from computer 15 are converted into a parallel form suitable to operate the random access audio device 35. The information contained in the two-out-of-five code will determine which audio message will be read out of storage and presented to the student via earphones 34.

It is seen from the foregoing discussion that the present system has three modes of information presentation: audio; pictorial; and printed. The student may also respond in three modes: multiple choice selection of a pictorial presentation; multiple choice selection of a printed presentation; or a constructed response (typed). The presentation modes and the response modes may occur singly or in combinations.

The details of operation of each of the presentation and response modes will be discussed in relation to the previously described circuits and structure.

*Audio Mode*

In response to the decision rules stored in program retention means 55, evaluation means 58 through selection means 56 reads out the desired stored audio information from the proper track of main dictionary 51. This information, in the form of a twenty-three bit decimal digit code (four 2 out of 5 bit codes and one 3 bit code) is transmitted through output buffer storage 48 to random access audio input circuit 36 (FIG. 6) where the signal is converted to parallel form and applied to the random access audio device 35 which produces a selected audio message signal in response to the coded input information. This audio signal is transmitted to earphones 34 to provide an audible message to the student. The audible message is the "word" which the student must spell or select.

*Pictorial Mode*

In response to the decision rules in program retention means 55, evaluation means 58 causes selection means 56 to read out the desired stored visual information from the proper track of main dictionary 51. This information, in the form of two separate six bit digital signals, is transmitted through buffer storage 48 to digital-to-analog converter input circuits 24 and 26 (FIG. 5). The output signals from converter input circuits 24 and 26 are applied to digital-to-analog converters 23 and 25. The digital-to-analog converters 23 and 25 provide analog signals proportional to the digital value of the signals from input circuits 24 and 26. These analog signals, through servo-motors 27 and 29, cause cylinder 19 to be linearly and rotationally positioned to provide the desired display on screen 7. The display, as previously described, may include a single image, or a plurality of images as shown in FIG. 3 depending on the individual slide 20 selected.

*Print Mode*

In response to the decision rules in program retention means 55, evaluation means 58 causes selection means 56 to read out the desired stored print information from the proper track of main dictionary 51. This information, in the form of six bit digital code signals is transmitted through output buffer storage 48 to print input circuit 38 (FIG. 5). The output signals from input circuit 38, also in six bit code, are applied to the six print solenoids in typewriter 1. Depending on the various combinations of the six solenoids that are energized, various ones of the keys of typewriter 1 will be caused to strike, thereby printing out the information contained in the coded signals. The information is printed in the form of separate words in one or more of the seven slots 46 shown in FIG. 3.

*Multiple Choice Response Mode*

The student may be requested, via "FIND IT" lamp 41 to either select one of a plurality of displayed images or one of a plurality of printed words, so the multiple choice response mode is actually two separate modes.

When a plurality of display images are projected onto screen 7 as shown in FIG. 3, the student is requested to select one of the images by a separate command. For example, the images as shown in FIG. 3 may be displayed and the student is then audibly given the word "chair" by means of the earphones. The "FIND IT" lamp indicates that the student must select, via push buttons 5, the picture of a chair. The student responds by depressing a push button. The depressing of the push button closes a relay which applies a +48 volt signal on a separate lead in cable 8. The +48 volt signal on the lead in cable 8 is transmitted to display selector output circuit 9 (FIG. 4) which in turn transmits a −2 volt signal on a separate lead in cable 16 through input buffer storage 14 to evaluation means 58. If the proper button was pressed (i.e. the one below the picture of the chair) the evaluation means determines that the student is correct and transmits a "correct" signal through lamp input circuit 31 (FIG. 5) to lamp 43 (FIG. 3) and also stores a "correct" bit in student record retention means 53. If the student presses an incorrect button the signal will be likewise transmitted on the separate lead associated with the incorect button and be ultimately received by evaluation means 58. Evaluation means 58 will then cause a "wrong" signal to be transmitted to lamp 45 (FIG. 3) and also store a "wrong" bit in student record retention means 53. In addition, the question in error (i.e. select "chair") is stored in error dictionary 52, which is a selected storage track or disc for retaining questions in error so that a review presentation cycle may be generated consisting of the student's weak areas.

When a plurality of printed words are typed in position beneath slots 46 (FIG. 3) in response to print signals from the computer, the student is requested to select one of these printed words by a separate command. For example, seven distinct words are printed in slots 46 such as "cat," "dog," "hat," "chair," etc. The student is then given a separate command such as the audible word "chair" via the earphones or by a single image of a chair on the display screen, and he is instructed to "FIND IT" via light 41. The student selects the one of the buttons 6 asociated with the slots that he believes is over the printed word "chair." The signal from the selected button is transmitted via a lead in cable 10, and the response is processed in the same manner as described hereinabove for push buttons 5.

*Constructed Response Mode*

The student may also be requested to respond to one or more of the three presentation modes by spelling the word on the typewriter. Thus, the student may be presented a single image of a chair on screen 7, or be given the word "chair" in one of the slots 46 (which is then removed by indexing the typewriter roller), or he may be given all three presentations or combinations thereof. The student is then requested to "SPELL IT" by light 42. The student then operates the typewriter keyboard to spell the word. The typewriter keys activate the six typewriter output contacts in distinct combinations to produce +48 volt signals on the six separate leads in cable 12. These signals are transmitted through key output circuit 13 (FIG. 4) to input buffer storage 18. Evaluation means 58 determines from the coded signals whether the word was properly spelled. If the student is correct this is noted in student record retention means 53 and the "correct" lamp 43 is actuated. If the student is incorrect the word is stored in error dictionary 52, the error is noted in student record retention means 53 and the "wrong" lamp 45 is actuated.

When any of the presentation modes or combinations thereof occur, a signal from evaluation means 58 starts the clock cycle of clock 59. If a response is not received within a predetermined time a "wrong" indication is stored in student record retention means 53, a "time up" signal is transmitted to lamp 44, the presented question is stored in error dictionary 52 and the next presentation is offered.

It can be appreciated by one skilled in the art that the three presentation modes and the three response modes may be operated in various combinations. There are twenty-one possible combinations of presentations with a single response, and these are outlined for clarity in the following table.

| Presentation Modes | | | Response Modes | | |
|---|---|---|---|---|---|
| Audio | Pictorial | Print | Pictorial Choice | Print Choice | Typed |
| X | | | X | | |
| X | | | | X | |
| X | | | | | X |
| | X | | X | | |
| | X | | | X | |
| | X | | | | X |
| | | X | X | | |
| | | X | | X | |
| | | X | | | X |
| X | X | | X | | |
| X | X | | | X | |
| X | X | | | | X |
| X | | X | X | | |
| X | | X | | X | |
| X | | X | | | X |
| | X | X | X | | |
| | X | X | | X | |
| | X | X | | | X |
| X | X | X | X | | |
| X | X | X | | X | |
| X | X | X | | | X |

The above table indicates the twenty-one possible modes of operation of the system where the student responds in a single mode. It is to be noted that there are twenty-one further possibilities wherein the student responds in combinations of two of the three response modes, and seven further possibilities wherein the student responds in all three response modes, providing a total number of forty-nine distinct modes of operation of the system.

The particular ones of the forty-nine possible modes of operation which will be employed in any given instance will depend on the type of student and on the mental concept being stressed. Thus the presentations and responses might differ if the student is an inexperienced child learning to read, an older child learning to spell, or an adult learning the vocabulary of a foreign language. For example, reading may be taught by utilizing the print mode supported by the audio and/or pictorial mode, vocabulary may be taught by also using print mode with the audio and/or pictorial mode, pronunciation of words may be taught by the audio mode with the print and/or pictorial mode and spelling may be taught by the typed mode with any or all of the pictorial, audio and print modes. One of the advantages of the present invention is that by altering the decision rules stored in the program retention means, or the subject material stored in the main dictionary, or the slide images in the projection means, a great variety of subject matter may be taught in many distinct modes. Therefore, the present invention exhibits a great versatility and may be utilized by students within a large range of age, intelligence, and experience for the purpose of the teaching of such related mental concepts as spelling, reading, vocabulary, and word associations in English and in foreign languages.

It is also to be noted that the sequence of operation of the system may be selected to provide the most efficient procedure for a given teaching situation. For example, when a problem is answered incorrectly it may be desirable to repeat the problem until a correct response is received, or provide other problems which might elucidate the concept before presenting a repeat of the problem. As a student progresses, it may be desirable to eliminate the course material with which he has demonstrated proficiency. Such variations in sequence may be accomplished by altering and modifying the decision rules in the program retention means 55 of computer 15.

What has been described is an apparatus for teaching related mental concepts. The apparatus, which includes multiple presentation channels and multiple response channels which may be operated independently or in a large variety of combinations, exhibits both a high degree of versatility and teaching effectiveness. The apparatus is adaptable for use by a wide range of students, from children attempting to learn reading and spelling of basic English to adults studying vocabulary and pronunciation of foreign languages. The apparatus is simple to use, requiring the student to either select a push button or manipulate a keyboard.

While the invention has been particularly shown and described with reference to a preferred embodiment thereof, it will be understood by those skilled in the art that various changes in form and details may be made therein without departing from the spirit and scope of the invention.

What is claimed is:

1. An educational device for the teaching of the related mental concepts of reading, vocabulary, pronunciation, and spelling comprising:

a typewriting device adapted to be manually operated to produce output signals and to automatically operate in response to input signals, a cover panel mounted on said typewriter for concealing the platen of said typewriter, said cover panel including a plurality of apertures therein for displaying selected portions of said typewriter platen and a first plurality of switches for producing output signals associated with said apertures, said cover panel further including a display screen for displaying projected images, a second plurality of switches for producing output signals associated with said display screen, and a plurality of indicator lamps mounted on the surface of said cover panel for illumination in response to input signals, a projection means for selectively projecting pictorial images onto said display screen, said projection means including a hollow cylindrical drum having a plurality of transparent surface areas with pictorial images disposed thereon, a light source mounted internal said cylinder and directing a light beam through one of said plurality of transparent areas onto said display screen, first means coupled to said cylinder for rotationally driving said cylinder about its axis in response to input signals, second means coupled to said cylinder for laterally driving said cylinder along its axis in response to input signals, said first and second driving means enabling each of said plurality of transparent areas to be selectively positioned in the path of said light beam for rotation onto said display screen, a means for selectively producing an audible message including a storage device having a plurality of discrete messages stored thereon, means for selectively reading out given ones of said stored messages in the form of audio frequency signals, and earphones responsive to the signals from said read-out means for converting said signals into audible messages.

and a computing means coupled to said typewriting device, said cover panel, said projection means and said audio means for providing input signals to said typewriting device, to said cover panel indicator lamps, to said first and second projector driving means and to said audio read-out means, and for receiving response signals from said typewriting device and from said first and second plurality of switches, said computing means evaluating said response signals with respect to the input signals transmitted to said projection means, said audio means, and said typewriter means.

2. An educational device for the teaching of related mental concepts comprising:

presentation means including an audio channel, a pictorial channel, and a print channel for presenting given information in said channels, singly and in combinations thereof, said pictorial channel including a projector and a display screen, said projector including a hollow cylindrical drum having a plurality of transparent surface areas with pictorial images disposed thereon, a light source mounted internal said cylinder and directing a light beam through one of said plurality of transparent areas, first means coupled to said cylinder for rotationally driving said cylinder about its axis, second means coupled to said cylinder for laterally driving said cylinder along its axis, first and second driving means enabling each of said plurality of transparent areas to be selectively positioned in the path of said light beam, and wherein said display screen is mounted external to said cylinder and in the path of said light beam being directed through said transparent area with said image thereon to provide a display surface for said light projection, means for responding to said presentation means including multiple choice selection channels and a constructed response channel for responding in said multiple choice selection channels and said constructed response channel, singly and in combinations thereof, and an information processing device coupled to said presentation means and said response means for transmitting said given information to said presentation means and for receiving and evaluating said response information from said response means.

3. An educational device according to claim 2 wherein selected ones of said plurality of transparent surface areas have a single pictorial image disposed thereon and other selected ones of said plurality of transparent surface areas have multiple pictorial images disposed thereon.

References Cited in the file of this patent

UNITED STATES PATENTS 3,052,041     Luxton et al. _____ Sept. 4, 1962

OTHER REFERENCES

"An Automated Teaching System," published in 1961, by the Institue for Instructional Improvement, Inc., New York 16, N.Y. (8 pp. relied upon.)

"Automatic Teaching: The State of the Art," edited by Galanter and published in 1959, by John Wiley & Sons. (Chapter 11, pp. 117–130.)